United States Patent Office 2,791,806
Patented May 14, 1957

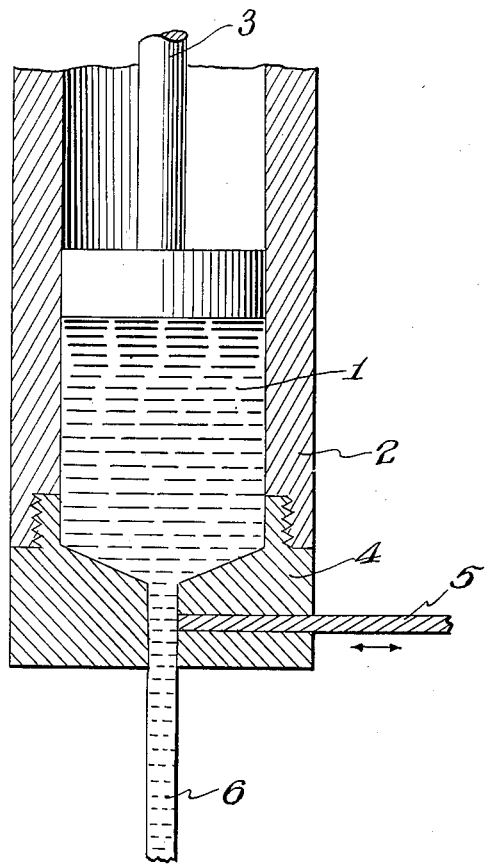

2,791,806

EXTRUSION OF POLYTETRAFLUOROETHYLENE AT TEMPERATURES ABOVE THE NORMAL MELTING POINT

John P. Tordella, Wilmington, Del., assignor to E. I. du Pont de Nemours and Company, Wilmington, Del., a corporation of Delaware Application August 21, 1953, Serial No. 375,822

4 Claims. (Cl. 18—55)

This invention relates to extrusion of substantially pure polytetrafluoroethylene at temperatures above the normal, atmospheric pressure melting point of polytetrafluoroethylene.

It has been known heretofore that polytetrafluoroethylene can be extruded at temperatures below its normal melting temperature (327° C.) in the form of lubricated pastes (Lontz et al. U. S. P. 2,593,582; Llewellyn et al. U. S. Patent application S. N. 175,534, filed June 30, 1950). It has also been known that polytetrafluoroethylene at temperatures above this normal melting point does not have the properties of an ordinary liquid. Melt extrusion of polytetrafluoroethylene has been virtually impossible because of the very high viscosity ($10^{10}$ to $10^{11}$ poises at 350° C.) and a finite shear strength (about $10^7$ dynes/cm.$^2$ at 350° C.) of the melted plastic. In contrast with this, processes for extrusion of polytetrafluoroethylene pastes at temperatures below the melting point produced rapid flow and smooth-surfaced products which, however, were relatively weak until subjected to a subsequent sintering operation. After sintering, these products were strong and tough. Elimination of the sintering step would simplify and expedite the extrusion process. However, there have been no known methods heretofore for extrusion of polytetrafluoroethylene to strong, tough products at temperatures below the atmospheric pressure melting point without the addition of a final sintering step.

In U. S. P. 2,456,621, it is disclosed by Cheney that an improved result is obtained in the extrusion of polytetrafluoroethylene by pre-baking the finely divided polymer at 300° to 500° C. prior to extrusion. The character of the polymer is changed materially by prebaking, especially at temperatures above 327° C. Such prebaking produces a polymer which cannot be extruded satisfactorily by the process of the present invention, to be described hereinafter. The effect of prebaking is to impart an undesirable property to the virgin polymer, namely, an inability to yield a coherent extrudate in the process of the present invention. The Cheney process requires extrusion of the prebaked polymer, which may be, but need not be, preheated to from 200° to 300°, or even as high as 327°, prior to extrusion. Cheney does not employ a temperature above 327° in contact with the extrusion screw, but increases the temperature of the polymer in the die to above the sintering temperature, e. g. 360° C.

Heretofore it has been impractical to feed entirely unbaked polytetrafluoroethylene to an extruding machine, although mixtures of baked and unbaked polytetrafluoroethylene have been shaped at temperatures not exceeding the sintering temperature, and thereafter heated at 327° to 500° C. until sintered (Bogese, U. S. P. 2,485,691). In the latter process, the rates of extrusion were as high as 12 ft. per hour (0.275 in. orifice) while in the process described hereinafter the corresponding rates were as much as 16 times as high as this maximum.

An object of this invention is to provide a process for rapid extrusion of polytetrafluoroethylene in substantially pure form at temperatures above the normal atmospheric pressure melting point of polytetrafluoroethylene to give strong tough products without prebaking and without the addition of a final sintering step.

It has been discovered in accordance with this invention that unbaked polytetrafluoroethylene can be extruded at surprisingly high speeds at temperatures substantially above the melting point at atmospheric pressure but below the melting point at extrusion pressure. This discovery depends upon the observation that the so called "melting point" of unbaked polytetrafluoroethylene varies with pressure (ca. 9° C. increase per 1000 p. s. i. increase in pressure). It depends also upon the further observation that at temperatures above the normal melting point, but at pressures high enough to prevent melting, polytetrafluoroethylene can be deformed with comparative ease. In other words, smooth coherent extrudates of the molten polymer are obtained rapidly from non-molten polymer in the high pressure cylinder, at cylinder temperatures above the normal melting temperature of the polymer. This phenomenon of increased flowability of polymer which is not completely molten and never has been melted, as compared with polymer which had been melted is not observed in plastics, generally, and in fact is observed only in very exceptional cases, or is a unique property of polytetrafluoroethylene. Normally, extrusion of a polymer is facilitated by melting, but with polytetrafluoroethylene this normal behaviour is not observed.

The present invention, however, is not limited to the discovery of the anomalous effect of melting in lowering the extrusion rate, but embodies also the sintering of the extruded polymer by the lowering of the pressure which occurs in the die of the extrusion apparatus. For best results unduly long dies should be avoided. The invention is thus directed to the process of introducing substantially pure, unbaked polytetrafluoroethylene into an extruder, raising the temperature of the said polytetrafluoroethylene to above 327° C. while applying sufficient pressure to prevent melting of the polymer at the existing temperature, and discharging the polymer through a die where melting of the extrudate occurs, as a result of the lowering of the pressure therein.

When polytetrafluoroethylene is extruded in this manner a change corresponding to the final sintering step in the prior art processes occurs in the said die inasmuch as the melting point of the polytetrafluoroethylene as it travels through the die drops to its value at the lower pressure (which may be atmospheric pressure). The net effect of controlling the temperature and the pressure in the manner described herein is to produce extruded articles which are substantially identical in strength and toughness with polytetrafluoroethylene articles formed by the relatively slow processes of the prior art. By carrying out the extrusion in this manner, it is possible to achieve extrusion rates from 10 to 100 times greater than were possible heretofore using unlubricated polymer.

The process of this invention can be carried out either continuously or intermittently. In the intermittent process, it is generally desirable to cool the residual charge in the extruder to below 327° C. before releasing the pressure. Otherwise, the residual polymer melts, and the adverse effects associated with prebaking occur. As noted hereinabove, any prebaking at temperatures above 300° C., and any premelting of the polymer, destroys its capacity to extrude rapidly in the form of a coherent extrudate by the process of this invention.

The temperatures employed in the extruder cylinder and in the die should be high enough to give adequate melting, caused by pressure lowering (without temperature increase) in the die. A minimum temperature of 350° is accordingly preferred. The maximum temperature from a practical standpoint is preferably the highest temperature which will not produce harmful thermal decomposition, or melting, at pressure which are realizable in ram extruders. A temperature as high as 400° C., or even higher can be used but this requires extraordinarily high pressures. At 350° C. the pressure required to suppress excessive melting is about 3000 p. s. i. At 375° C. the corresponding pressure is about 5000 p. s. i. Corresponding higher pressures are required at higher temperatures. At a pressure of 3500 p. s. i. the working temperature range is extremely narrow, not more than a few degees. At 4000 p. s. i. the working temperature range is somewhat less than 10° C. Higher pressures are needed if it is desired to avoid sensitivity to small changes in temperature. A suitable range of temperatures for pressures of 7500 to 10,000 p. s. i. is 350° to 375° C.

Any form of unbaked polytetrafluoroethylene resin can be employed in the practice of this invention. For example, the agglommerated colloidal and the granular forms may be used. Polytetrafluoroethylene resins having end groups supplied by ingredients other than tetrafluoroethylene are included.

The invention is illustrated further by means of the following examples.

*Example 1.*—Into a ram extruder, as shown in the attached drawing, heated to the temperatures set forth in the following table were placed specimens of unbaked polytetrafluoroethylene. This polymer 1 was heated in the extruder cylinder 2 in each instance to the said temperature, while applying a pressure by the piston 3 somewhat above that required to restrain melting of the polymer, said pressures being specified in the table. The outlet of the die 4 was then unblocked (valve 5) and the polytetrafluoroethylene extruded at the rates given in the table, in the form of a smooth sintered polytetrafluoroethylene extrudate 6.

TABLE I

*Linear rates of extrusion of polytetrafluoroethylene*

| Die Dimensions | | Pressure, p. s. i. | Temp., °C. | Rates of Extrusion for Different Forms of Polytetrafluoroethylene | |
|---|---|---|---|---|---|
| Diameter, inch | Length inch | | | Agglomerated Colloid, ft./hr. | Granular, ft./hr. |
| 0.046 | 0.848 | 8,800 | 370 | 540 | 129 |
| 0.046 | 0.848 | 6,600 | 370 | 562 | 36 |
| 0.046 | 0.020 | 8,800 | 370 | 108 | 174 |

*Example 2.*—Example 1 was repeated (0.858 in. die) using a simple cross head for wire coating at the die outlet. The wire having a diameter of 0.025 in. was passed through the cross head whereupon a coating 0.010 to 0.015 in. thick was applied. Sections of the resulting coated wire, 3 to 5 in. long were tested for breakdown potential which was found to be above 7500 volts. In this application sound weld lines were produced.

Extrusion of polytetrafluoroethylene by the method illustrated in these examples gives rise to partially oriented articles. This is shown by the following comparison of tensile strength of ordinary molded unoriented polytetrafluoroethylene and polytetrafluoroethylene which has been extruded as hereinabove described.

TABLE II

*Comparison of tensile properties of unoriented polytetrafluoroethylene and polytetrafluoroethylene obtained by extrusion wherein melting occurs in the die as a result of pressure lowering*

| Form of polytetrafluoroethylene | Unoriented Specimens | | | Specimens Extruded by Process of This Invention | | |
|---|---|---|---|---|---|---|
| | Tensile Strength, p. s. i. | Percent Elongation | Ultimate Tensile Strength Based on Final Cross Section | Tensile Strength, p. s. i. | Percent Elongation | Ultimate Tensile Strength Based on Final Cross Section |
| Granular | 3,478 | 300 | 13,842 | 20,000 | 50 | 30,000 |
| Agglomerated Colloidal | 3,215 | 400 | 16,075 | 9,700 | 110 | 20,700 |
| Agglomerated Colloidal, Methanol Telomer | 1,511 | 80 | 2,720 | 2,150 | 120 | 4,730 |

It is to be understood that the examples hereinabove given are intended to illustrate, rather than limit, the invention. Numerous embodiments of the invention will occur to those who are skilled in the art. For example, multiple ram types of extruders may be employed instead of single ram types. The polymer can be introduced into the extruder cylinder as unbaked preform, if desired.

While the polytetrafluoroethylene employed in practicing this invention should be substantially pure, this does not exclude a few tenths of a percent of stabilizer, for example, or similar small percentages of colored pigments, etc., which do not in any substantial way affect the extrusion properties of the polytetrafluoroethylene.

I claim:

1. A process for extruding substantially pure unbaked polytetrafluoroethylene which comprises subjecting the said polytetrafluoroethylene in an extruder at a temperature above its atmospheric pressure melting point to a controlled pressure sufficient to restrain the melting of the said polytetrafluoroethylene, forcing the said polytetrafluoroethylene into a die at the said pressure and temperature, and permitting the pressure on the polytetrafluoroethylene to decrease as it passes through the said die, said decrease in pressure being sufficient to cause melting of the said polytetrafluoroethylene within said die.

2. The process of claim 1 wherein the said temperature is 350 to 375° C. and the said controlled pressure is 7500 to 10,000 p. s. i.

3. The process of claim 2, wherein the said polytetrafluoroethylene is introduced into the extruder in granular form.

4. The process of claim 2 wherein the said polytetrafluoroethylene is introduced into the extruder in agglomerated colloidal form.

References Cited in the file of this patent

UNITED STATES PATENTS

| | | |
|---|---|---|
| 2,456,621 | Cheney | Dec. 21, 1948 |
| 2,485,691 | Bogese | Oct. 25, 1949 |